(12) United States Patent
Miyazaki (10) Patent No.: US 7,260,331 B2
(45) Date of Patent: Aug. 21, 2007

(54) OPTICAL PULSE DEMULTIPLEXER AND METHOD THEREOF

(75) Inventor: Tetsuya Miyazaki, Tokyo (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 560 days.

(21) Appl. No.: 10/927,798

(22) Filed: Aug. 26, 2004

(65) Prior Publication Data

US 2005/0047452 A1   Mar. 3, 2005

(30) Foreign Application Priority Data

Aug. 28, 2003   (JP) .............................. 2003-303977

(51) Int. Cl.
*H04B 10/00* (2006.01)
(52) U.S. Cl. .......................... 398/176; 398/175; 398/97
(58) Field of Classification Search ......... 398/173–181
See application file for complete search history.

(56) References Cited

U.S. PATENT DOCUMENTS

| | | | | |
|---|---|---|---|---|
| 5,155,780 A | * | 10/1992 | Zirngibl ........................ 385/27 |
| 5,778,015 A | * | 7/1998 | Gunning et al. ............... 372/25 |
| 5,805,327 A | * | 9/1998 | Usami et al. ................. 359/244 |
| 5,900,968 A | * | 5/1999 | Srivastava et al. ...... 359/341.41 |
| 5,959,764 A | * | 9/1999 | Edagawa et al. ............ 359/326 |
| 6,078,416 A | * | 6/2000 | Yano .......................... 398/154 |
| 6,091,536 A | * | 7/2000 | Usami et al. ................. 359/244 |
| 6,124,966 A | * | 9/2000 | Yokoyama ................... 359/339 |
| 6,169,625 B1 | * | 1/2001 | Watanabe et al. ............ 359/244 |
| 6,204,944 B1 | * | 3/2001 | Uchiyama et al. ............. 398/79 |
| 6,441,939 B1 | * | 8/2002 | Bigo et al. ................... 398/179 |
| 6,504,637 B1 | * | 1/2003 | Yokoyama et al. ........... 398/97 |
| 6,532,091 B1 | * | 3/2003 | Miyazaki et al. ............. 398/175 |
| 6,549,314 B1 | * | 4/2003 | Yamaguchi .................... 398/68 |
| 6,650,845 B1 | * | 11/2003 | Kurita et al. ................ 398/175 |
| 6,775,478 B2 | * | 8/2004 | Suzuki et al. .................. 398/75 |
| 6,775,482 B1 | * | 8/2004 | Shimomura et al. ......... 398/183 |

(Continued)

OTHER PUBLICATIONS

Hilliger, et al., "EAM with Improved Switching Performance by Self Cascading," OFC 2003, Tuesday Afternoon, vol. 1, pp. 268-269.

(Continued)

*Primary Examiner*—Agustin Bello
(74) *Attorney, Agent, or Firm*—Christie, Parker & Hale, LLP (57) ABSTRACT

To demultiplex a low-speed optical pulse signal from a high-speed optical pulse signal, an optical clock generator generates an optical clock of a control wavelength $\lambda p$ at a predetermined frequency out of a pulse signal light of a signal wavelength $\lambda s$. On one side of a saturable absorber, an optical band reflection mirror is disposed to reflect a light of the signal wavelength $\lambda s$ and to transmit a light of the control wavelength $\lambda p$. A pulse signal light of the signal wavelength $\lambda s$ reciprocates in the saturable absorber. An optical pulse of the pulse signal light of the signal wavelength $\lambda s$ enters the saturable absorber almost simultaneously with different optical pulses of the optical clock on the ways of going and returning. The saturable absorber has a transmission factor relative to the signal wavelength $\lambda s$. The transmission factor varies as the saturable absorber absorbs a light of the control wavelength $\lambda p$.

20 Claims, 4 Drawing Sheets

U.S. PATENT DOCUMENTS

| | | | |
|---|---|---|---|
| 6,807,379 B2 * | 10/2004 | Brindel et al. | 398/175 |
| 6,819,817 B2 * | 11/2004 | Kaneko et al. | 385/16 |
| 6,895,188 B1 * | 5/2005 | Shi et al. | 398/147 |
| 7,042,634 B2 * | 5/2006 | Aozasa et al. | 359/341.41 |
| 2005/0047788 A1 * | 3/2005 | Miyazaki | 398/85 |

OTHER PUBLICATIONS

Mitsuma, et al., "High Reliable InGaAsP Electro-Absorption Modulator Module for 10Gb/s Operation," Proc. 8th Int. Conf. Indium Phosphide Related Materials, 1996, TuP-C24, pp. 9-12.

Akiyama, et al., "1.55-μm Picosecond All-Optical Switchng by Using Intersubband Absorption in InGaAs-AlAs-AlAsSb Coupled Quantum Wells," IEEE Photonics Technology Letters, vol. 14, No. 4, Apr. 2002, pp. 495-497.

Heber, et al., "Comparative study of ultrafast intersubband electron scattering times at ~ 1.55 μm wavelength in GaN/AlGaN heterostructures," Applied Physics Letters, vol. 81, No. 7, Aug. 12, 2002, pp. 1237-1239.

* cited by examiner

OPTICAL PULSE DEMULTIPLEXER AND METHOD THEREOF

CROSS REFERENCE TO RELATED APPLICATIONS

This application claims priority to Japanese Patent Application No. 2003-303977, filed Aug. 28, 2003, the entire contents of which are incorporated herein by reference.

FIELD OF THE INVENTION

This invention generally relates to an optical pulse demultiplexer and method thereof, and more specifically relates to an optical pulse demultiplexer and method thereof to demultiplex a low-speed optical pulse signal from an ultra high-speed optical pulse at 160 Gbps or more.

BACKGROUND OF THE INVENTION

An ultra high-speed optical pulse signal can be generated by time-division-multiplexing a plurality of optical pulse signals (tributary channels), each carrying a data at the same standard bit rate (a base rate). For instance, when the base rate is 10 Gbps and the multiplexed number is 16, an ultra high-speed optical pulse signal at 160 Gbps can be generated. In a case that an ultra high-speed optical pulse signal having a single wavelength is desired, a plurality of low-speed optical pulse signals at the same base rate should be generated by dividing an output light from a single laser light source.

It is impossible to directly convert such an ultra high-speed optical pulse into an electric signal at a receiving terminal. Accordingly, it is necessary to demultiplex an optical pulse signal of each tributary channel out of an optical pulse signal input from an optical fiber transmission line. For an apparatus to demultiplex a low-speed optical pulse signal from an ultra high-speed optical pulse signal at 160 Gbps or more, a special ultra high-speed optically controlled optical switch such as an optically controlled optical switch using NOL (Nonlinear Optical Loop Mirror) and an optically controlled optical switch using SMZI (Symmetric Mach-Zehnder Interferometer) has been proposed.

The reference: E. Hilliger, et al., "EAM with Improved Switching Performance by Self Cascading," OFC 2003, Tuesday afternoon, Vol. 1, pp. 268-269 discloses an optical pulse demultiplexing switch in which an optical loop is disposed on one end of an EAM (electroabsorption modulator) so that a signal light reciprocates in the EAM. Because the extinction factor improves as a signal light reciprocates in the EAM, a switching window can be narrowed down.

In conventional optically controlled optical switches, pulse demultiplexing characteristics are greatly affected by fluctuations of polarization and phase of both an ultra high-speed optical pulse signal and a control optical pulse signal. Furthermore, since these conventional optically controlled optical switches use nonlinear interfering effects, the adjustment of polarization and the adjustment of phase are depending on each other and therefore there are a large number of pseudo optimum points. Accordingly, it is very difficult to adjust the polarization and phase into the optimum condition.

In a configuration in the above reference, a signal light sometimes oscillates on an optical feedback due to the crosstalk between ports of an optical circulator disposed on one end of an EAM to make the adjustments of polarization and phase difficult.

SUMMARY OF THE INVENTION

An exemplary optical pulse demultiplexer according to the invention includes an optical splitter to split a pulse signal light of a signal wavelength $\lambda s$ at a bit rate B into a first light portion and a second light portion, an optical clock generator to generate an optical clock of a control wavelength $\lambda p$ at a predetermined frequency lower than a frequency corresponding to the bit rate of the first light portion output from the optical splitter, a saturable absorber having a transmission factor relative to the signal wavelength $\lambda s$, an optical path to apply the optical clock output from the optical clock generator to the saturable absorber through one side of the saturable absorber, an optical band reflection mirror disposed on the optical path and to reflect a light of the signal wavelength $\lambda p$, an optical bandpass filter to transmit a light of the signal wavelength $\lambda s$ and to block a light of the control wavelength $\lambda p$, and an optical circulator disposed on another side of the saturable absorber and to apply the second light portion output from the optical splitter to the saturable absorber and to apply an output light from the saturable absorber to the optical bandpass filter. Characteristically, the transmission factor of the saturable absorber varies due to absorption of a light of the control wavelength $\lambda p$ by the saturable absorber, the pulse signal light of the signal wavelength $\lambda s$ reciprocates in the saturable absorber, and each optical pulse of the pulse signal light of the signal wavelength $\lambda s$ enters the saturable absorber almost simultaneously with different optical pulses of the optical clock on the ways of going and returning.

An exemplary optical pulse demultiplexer according to the invention includes an optical splitter to split a pulse signal light of a signal wavelength $\lambda s$ at a bit rate B into a first light portion and a second light portion, an optical clock generator to generate an optical clock of a control wavelength $\lambda p$ at a predetermined frequency lower than a frequency corresponding to the bit rate of the first light portion output from the optical splitter, a saturable absorber having a transmission factor relative to the signal wavelength $\lambda s$, am optical combiner to combine the optical clock output from the optical clock generator and the other output light from the optical splitter, an optical band reflection mirror disposed on one side of the saturable absorber to reflect a light of the signal wavelength $\lambda s$ and not to reflect a light of the control wavelength $\lambda p$, an optical bandpass filter to transmit a light of the signal wavelength $\lambda s$ and to block a light of the control wavelength $\lambda p$, and an optical circulator disposed on another side of the saturable absorber and to apply the second light portion output from the optical combiner to the saturable absorber and to apply an output light from the saturable absorber to the optical bandpass filter. Characteristically, the transmission factor of the saturable absorber varies according to absorption of a light of the control wavelength $\lambda p$ by the saturable absorber, the pulse signal light of the signal wavelength $\lambda s$ reciprocates _in the saturable absorber, and each optical pulse of the pulse signal light of the signal wavelength $\lambda s$ enters the saturable absorber almost simultaneously with different optical pulses of the optical clock on the ways of going and returning.

With the above configurations of the invention, while an input pulse signal reciprocates in the saturable absorber, it receives pulse demultiplexing effects on both ways, and therefore a desired channel part can be accurately demultiplexed.

The pulse demultiplexing efficiency is even improved when an optical clock pulse and a pulse signal light transmit in the opposite directions in the saturable absorber compared to a case that they transmit in the same direction. Accordingly, the higher demultiplexing performance is realized when a pulse signal reciprocates in a saturable absorber compared to a case that pulse demultiplexing is merely performed twice in serial.

An optical pulse demultiplexer according to the invention, preferably, further comprises a first optical delay disposed between the optical band reflection mirror and the saturable absorber on the optical pass, and a second optical delay disposed between the optical clock generator and the optical band reflection mirror on the optical path. This configuration makes it easier to adjust the timing that each optical pulse of a pulse signal light of the signal wavelength λs enters the saturable absorber almost simultaneously with different optical pulses of the optical clock on the ways of going and returning.

When the pulse signal light has a spectrum component at the predetermined frequency, it is possible to generate an optical clock at the predetermined frequency using a simple configuration. That is, the optical clock generator preferably comprises an optical photoelectric converter to convert one of the output lights from the optical splitter into an electric signal, an electric clock generator to generate an electric clock at the predetermined frequency out of an electric output from the photoelectric converter, and a pulse light source to output the optical clock of the control wavelength λp at the predetermined frequency according to the electric clock output from the electric clock generator. The electric clock generator comprises for instance a PLL circuit or an electric bandpass filter.

An optical pulse demultiplexer according to the invention preferably further comprises a bidirectional optical amplifier disposed between the optical band reflection mirror and the saturable absorber on the optical path. With this configuration, the saturable absorber can be used in a region with higher loss relative to the signal wavelength and accordingly a high extinction factor can be realized.

In an exemplary optical pulse demultiplexing method according to the invention, an optical clock of a control wavelength λp at a predetermined frequency is generated from an input pulse signal light of a signal wavelength λs at a bit rate B. The predetermined frequency is lower than a frequency corresponding to the bit rate B. An optical pulse of the input pulse signal light enters into the saturable absorber almost simultaneously with an optical pulse of the optical clock. The light of the signal wavelength λs output from the saturable absorber is turned back and reenters into the saturable absorber almost simultaneously with anther optical pulse of the optical clock. The optical signal of the signal wavelength λs which has reciprocated in the saturable absorber is extracted.

As explained above, the pulse demultiplexing is performed twice in the saturable absorber since the input pulse signal light reciprocated in the saturable absorber and each optical pulse of the input pulse signal light enters the saturable absorber almost simultaneously with different optical pulses of the optical clock on the ways of going and retuning. With this operation, the pulse demultiplexing efficiency is improved and therefore a desired channel can be accurately demultiplexed.

The pulse demultiplexing efficiency is even improved when an optical clock pulse and a pulse signal light propagate in the opposite directions in the saturable absorber compared to a case that they propagate in the same direction. Accordingly, a higher demultiplexing efficiency can be realized when an optical pulse reciprocates in the saturable absorber compared to a case that the pulse demultiplexing is merely performed twice in serial.

According to the invention, a low-speed optical pulse signal is accurately demultiplexed from a high-speed optical pulse signal and in addition a higher demultiplexing performance is realized compared to a case that the pulse demultiplexing is performed twice in serial.

BRIEF DESCRIPTION OF THE DRAWINGS

The above and other objects, features and advantages of the present invention will be apparent from the following detailed description of explanatory embodiments of the invention in conjunction with the accompanying drawings, in which:

FIG. 2, including FIGS. 2(a) to 2(d), is a timing chart showing demultiplexing characteristics of a saturable absorber 32, when pulses enter in the opposite direction;

FIG. 3, including FIGS. 3(a) to 3(b), is a timing chart showing demultiplexing characteristics of the saturable absorber 32, when pulses enter in the same direction.

DETAILED DESCRIPTION

Explanatory embodiments of the invention are explained below in detail with reference to the drawings.

Figure 1:
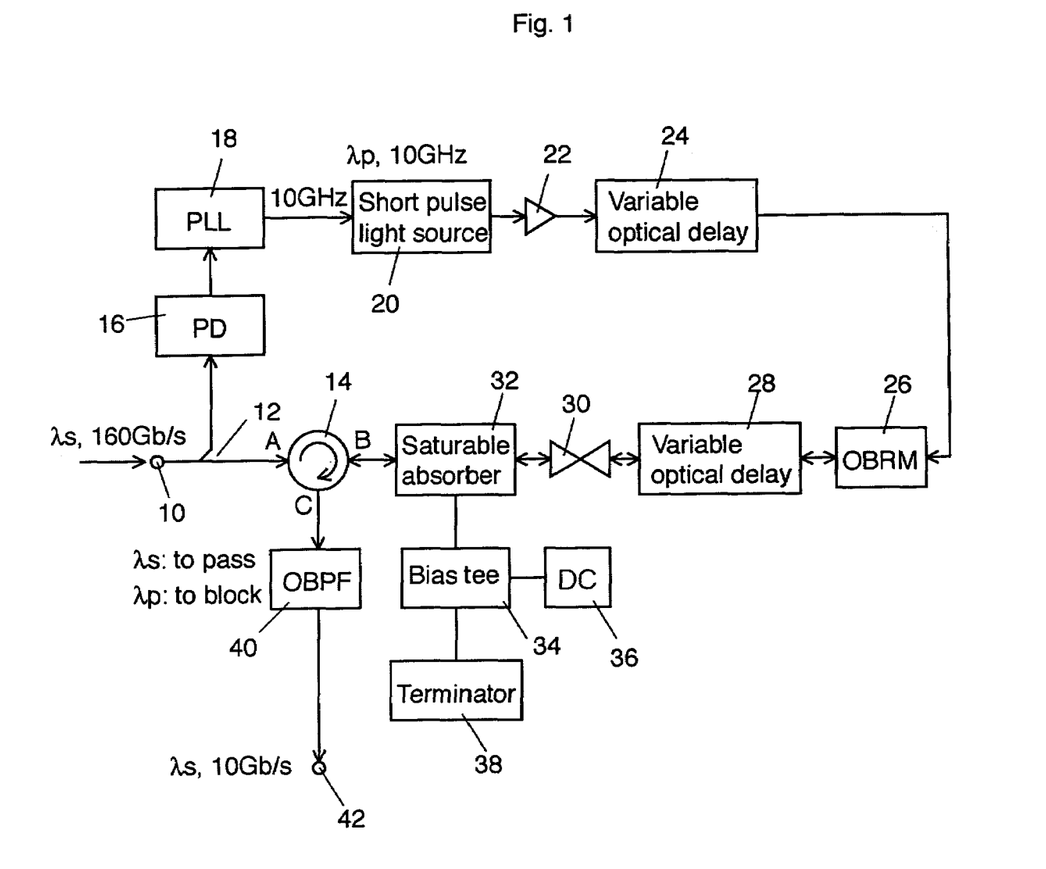
FIG. 1 is a schematic block diagram of a first explanatory embodiment according to the invention.

FIG. 1 is a schematic block diagram of a first explanatory embodiment according to the invention.

An optical pulse signal light having a signal wavelength λs at 160 Gbps enters an input terminal 10. Here, the optical pulse signal light at 160 Gbps comprises a signal light wherein 16 pulse data lights, namely 16 channels, at a base rate 10 Gbps are time-division-multiplexed. Amplitude of a pulse signal light of one channel is set slightly narrower than amplitudes of pulse signal lights of the other 15 channels, and by this configuration, a tone component at 10 GHz is superimposed on an optical pulse signal light at 160 Gbps. A tone component at 10 GHz also can be superimposed by modulating optical phase of the signal light instead of the amplitude. The width of each optical pulse of the optical pulse signal light at 160 Gbps is set to approximately 3 to 4 ps.

An optical splitter 12 splits an optical pulse signal from the input terminal 10 into two portions and applies one portion to a port A of an optical circulator 14 and the other to a photodiode 16. The photodiode 16 is sufficient if it is capable of following 10 GHz and not necessary to be capable of following the 160 Gbps pulse signal light. Since the pulse signal light at 160 Gbps includes the tone component at 10 GHz, an output electric signal from the photodiode 16 also includes a frequency component at 10 GHz.

A PLL circuit 18 generates an optical clock synchronized with the output electric signal from the photodiode 16 and applies the generated clock to a short pulse light source 20. The short pulse light source 20 generates an optical clock of a control wavelength λp, which comprises short pulses (e.g. 7 to 10 ps) at 10 GHz, synchronized with the output from the PLL circuit 18. The control wavelength λp is different from the signal wavelength λs. An electric bandpass filter can be used instead of the PLL circuit 18 to extract a component at 10 GHz out of the output from the photodiode 16.

Since the clock output from the short pulse light source 20 is used as an optical control pulse to demultiplex a channel at 10 Gbps from a signal light at 160 Gbps, its pulse width should be wide enough to separate individual optical pulses of the input pulse signal light at 160 Gbps. More specifically, the optical pulse width of the optical clock output from the short pulse light source 20 should be wider than the optical pulse width (e.g. 3 to 4 ps) of the input pulse signal light at 160 Gbps and should not fully contain two temporally adjacent optical pulses of the input pulse signal light. However, as to be described later, in this embodiment, since the optical pulse demultiplexing characteristics are improved, the pulse width of the optical clock pulse output from the short pulse light source 20 can be wider to the extent, e.g. 7 to 10 ps, that the pulse width partially includes an optical pulse which is following the aimed optical pulse of the input pulse signal light.

The optical clock output from the short pulse light source 20 enters a saturable absorber 32 through a optical amplifier 22, a variable optical delay 24, an optical band reflection mirror (OBRM) 26 for reflecting signal wavelength λs and for transmitting control wavelength λp, a variable optical delay 28, and bidirectional optical amplifier 30.

On the other hand, the optical circulator 14 applies the pulse signal light at 160 Gbps input through the port A from the optical splitter 12 to the saturable absorber 32 through the port B. At this point, the saturable absorber 32 receives the input pulse signal light at 160 Gbps through one terminal facet and the optical clock at 10 GHz through the other terminal facet. The pulse signal light of signal wavelength λs and the optical clock of control wavelength λp propagate in the opposite direction in the saturable absorber 32. The delay time of the variable optical delay 24, 28 is set so that the optical pulse signal of the signal wavelength λs and the optical clock of the control wavelength λp enter the saturable absorber 32 almost simultaneously.

In the saturable absorber 32, the absorption of the signal wavelength λs is temporarily saturated according to the optical clock of the control wavelength λp due to the mutual absorption modulation effect and consequently the transmission factor of the signal wavelength λs temporarily increases. More specifically, the transmission factor of the signal wavelength λs steeply increases at the rise time of an optical pulse of the optical clock of the control wavelength λp and then gradually decreases within a certain relaxation time. This operation is, so to speak, equivalent to the one to open the gate for a certain time regarding the optical clock pulse of the control wavelength λp as an optical control signal, and therefore with this operation a desired channel such as ch1 can be demultiplexed from the input pulse signal light.

As examples for the saturable absorber 32 to operate at high-speed, there are an electroabsorption optical modulator and an intersubband transition (ISBT) optical switch. An embodiment to use an electroabsorption optical modulator as a saturable absorbing element is described in T. Mitsuma, S. Takasaki, K. Hirano, D. Uchida, N. Hoshi, H. Ishiki, K. Maezawa, H. Sasaki, M. Honda. N. Oka, H. Tanaka, and Y. Matsushima, "High reliable InGaAsP electro-absorption modulator module for 10 Gb/s operation," in Proc. 8$^{th}$ Int. Conf. Indiumu Phosphide Related Materials, 1996, TuP-C24, pp. 9-12. The details of an ISBT optical switch are described, for example, in J. D. Heber, et al., Appl. Phys. Lett. Vol. 81, 2002, pp. 1237-1239, and Tomoyuki Akiyama, Nikolai Georgiev, Teruo Mozume, Haruhiko Yoshida, AchantaVenuGopal, and Osamu Wada, "1.55 μm picosecond all-optical switching by using intersubband absorption in InGaAs-AlAs-AlAsSb coupled quantum wells," IEEE Photon. Tech, Lett., vol. 14, No. 4, 2002, pp. 495-497.

A predetermined reverse bias DC voltage is applied to the saturable absorber 32 from a DC power source through a bias tee 34. The other terminal of the bias tee 34 is terminated by a terminator 38. The bias voltage of the saturable absorber 32, signal wavelength λs and clock control wavelength λp is selected or set so that the absorption factor/transmission factor of the optical pulse signal light of the signal wavelength λs varies to a desired extent according to whether or not the optical pulse of the control wavelength λp exists.

Figure 2A:
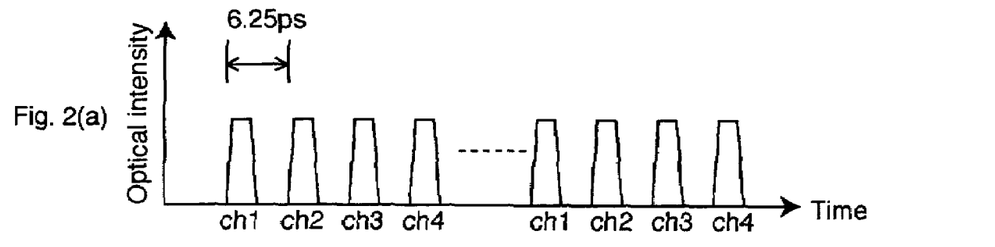
Figure 2B:
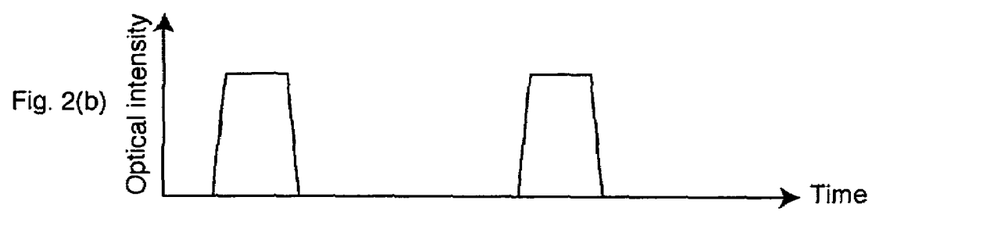
Figure 2C:
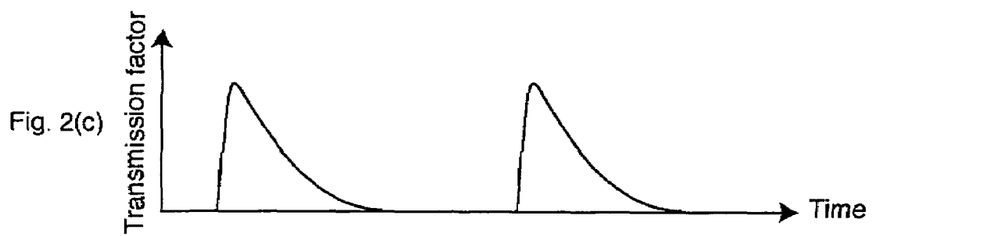
Figure 2D:
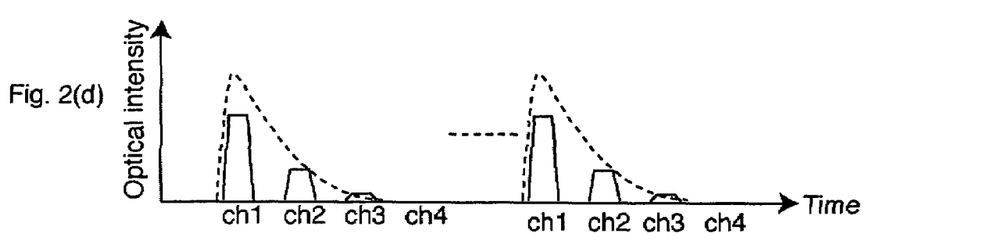

FIGS. 2(a)-(d) show timing charts of pulse demultiplexing in the saturable absorber 32 when a signal light of the signal wavelength λs and an optical clock pulse of the control wavelength λp propagate in the opposite direction in the saturable absorber 32. FIG. 2(a) shows a waveform example of an input pulse signal at 160 Gbps. FIG. 2(b) shows a waveform example of an optical clock of the control wavelength λp (an optical clock at 10 GHz generated by the short pulse light source 20) entered the saturable absorber 32. FIG. 2(c) shows a variation of transmission factor of the saturable absorber 32 relative to the signal wavelength λp due to the optical clock of the control wavelength λp. FIG. 2(d) shows a waveform example of a pulse signal light of the signal wavelength λs output from the saturable absorber 32 to the bidirectional amplifier 30. Since the transmission factor of the saturable absorber 32 relative to the signal wavelength λs varies as shown in FIG. 2(c) according to the optical clock pulse of the control wavelength λp, the channel ch1 can be demultiplexed when the delay time of each of the variable optical delays 24 and 28 is appropriately set. However, the transmission factor relative to the signal wavelength λs gradually decreases after the optical clock pulse of the control wavelength λp disappears, and therefore the following channels ch2 and ch3 remain.

Since the saturable absorber 32 is reversely biased, an electron pumped by the control optical pulse can be quickly discharged out of the saturable absorber 32 when the control optical pulse disappeared. With this operation, the transmission factor of the saturable absorber 32 relative to the wavelength λs acutely decreases.

The signal light of the signal wavelength λs output from the saturable absorber 32 to the bidirectional amplifier 30 is optically amplified by the bidirectional amplifier 30, delayed by the variable optical delay 28, and enters the optical band reflection mirror 26. Since the optical band reflection mirror 26 reflects a light of signal wavelength λs, the signal light of the signal wavelength λs finally re-enters the saturable absorber 32 through the variable optical delay 28 and bidirectional optical amplifier 30. In this embodiment, the delay time of the variable optical delay 28 should be adjusted so that the signal light of the signal wavelength λs re-enters the saturable absorber 32 almost simultaneously with another optical clock pulse of the control wavelength λp.

Figure 3A:
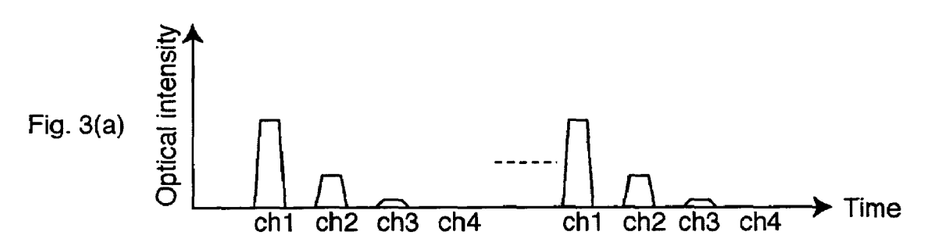
Figure 3B:
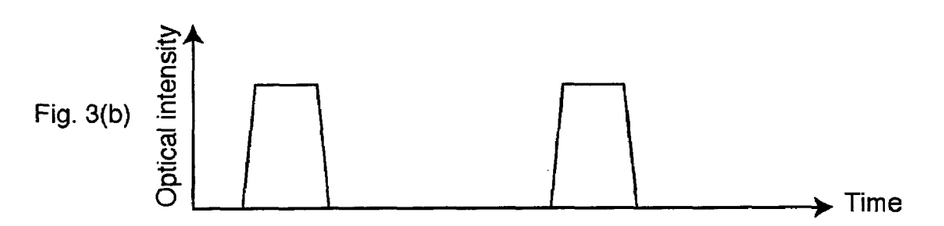
Figure 3C:
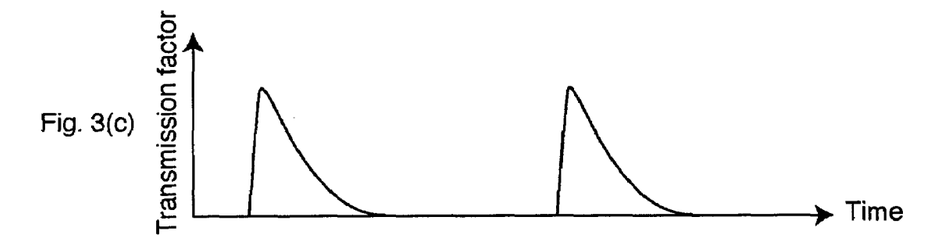
Figure 3D:
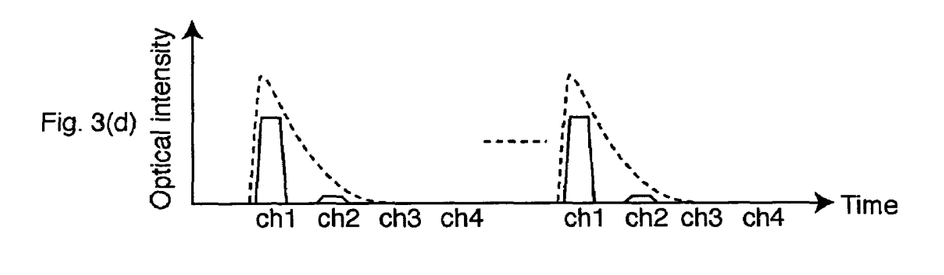

FIGS. 3(a)-(d) show timing charts of the pulse demultiplexing in the saturable absorber 32 when a signal light of the signal wavelength λs and an optical clock pulse of the control wavelength λp enter the saturable absorber 32 in the same direction. FIG. 3(a) shows a waveform example of a pulse signal reflected by the optical band reflection mirror 26 to re-enter the saturable absorber 32. FIG. 3(b) shows a waveform of an optical clock of wavelength λp (an optical clock at 10 GHz generated by the short pulse light source 20) entered the saturable absorber 32. FIG. 3(c) shows a variation of transmission factor of the saturable absorber 32 relative to the signal wavelength λs due to the optical clock of the control wavelength λp. FIG. 3(d) shows a waveform of a pulse signal light of the signal wavelength λs re-demultiplexed by the saturable absorber 32.

When the signal light of the signal wavelength λs and the optical clock pulse of the control wavelength λp enter the saturable absorber 32 in the same direction, the decrease of the transmission factor of the saturable absorber 32 relative to the signal wavelength λs quickens compared to a case that they enter in the opposite direction (FIG. 2(*c*)). With this operation, the transmission factor of the saturable absorber 32 relative to ch2 and ch3 reduces compared to a case of the opposite direction. Besides both variations of the transmission factor shown in FIGS. 2(*c*) and 3(*c*) doubly function to the input pulse signal, the blocking efficiency for ch2 and ch3 in the case of the same direction is higher than that in the case of the opposite direction. Therefore, in this embodiment, the efficiency for demultiplexing ch1 improves as shown in FIG. 3(*d*).

The signal light of the signal wavelength λs shown in FIG. 3(*d*) is output from the saturable absorber 32 and enters the port B of the optical circulator 14. The optical circulator 14 applies the signal light to an optical bandpass filter 40 through its port C. The optical bandpass filter 40 is an optical filter to pass through a light of the signal wavelength λs and to block a light of the control wavelength λp. Therefore, the signal light of the signal wavelength λs (the signal light of ch1) output from the port C of the optical circulator 14 transmits the optical bandpass filter 40 and is output to the outside from an output terminal 42.

The remaining optical clock pulses of the control wavelength λp not absorbed by the saturable absorber 32 are also applied to the optical bandpass filter 40 through the ports B and C of the optical circulator 14. However, since the optical bandpass filter 40 blocks a light of the control wavelength λp, the optical clock of the control wavelength λp is never output from the output terminal 42 toward the outside.

The loss of the wavelength λs in the saturable absorber 32 increases more, the higher extinction rate is obtained. In this embodiment, the bidirectional optical amplifier 30 is disposed to compensate the loss of the wavelength λs in the saturable absorber 32. In other words, by disposing the bidirectional optical amplifier 30, the saturable absorber 32 can be used in a region having large loss for the signal wavelength λs and therefore a higher extinction rate can be realized.

As explained above, in this embodiment, while a signal light reciprocates in the saturable absorber 32, ch1 is demultiplexed by optical clock pulses on both ways of going and coming, the efficiency for demultiplexing ch1 improves compared to that performed in only one direction.

In this embodiment, since the mutual absorption modulation effect of the saturable absorber 32 is used, the polarization dependency of the optical pulse signal light and optical clock lowers by 0.5 dB compared to that of an electroabsorption modulator used as the saturable absorber 32.

Figure 4:
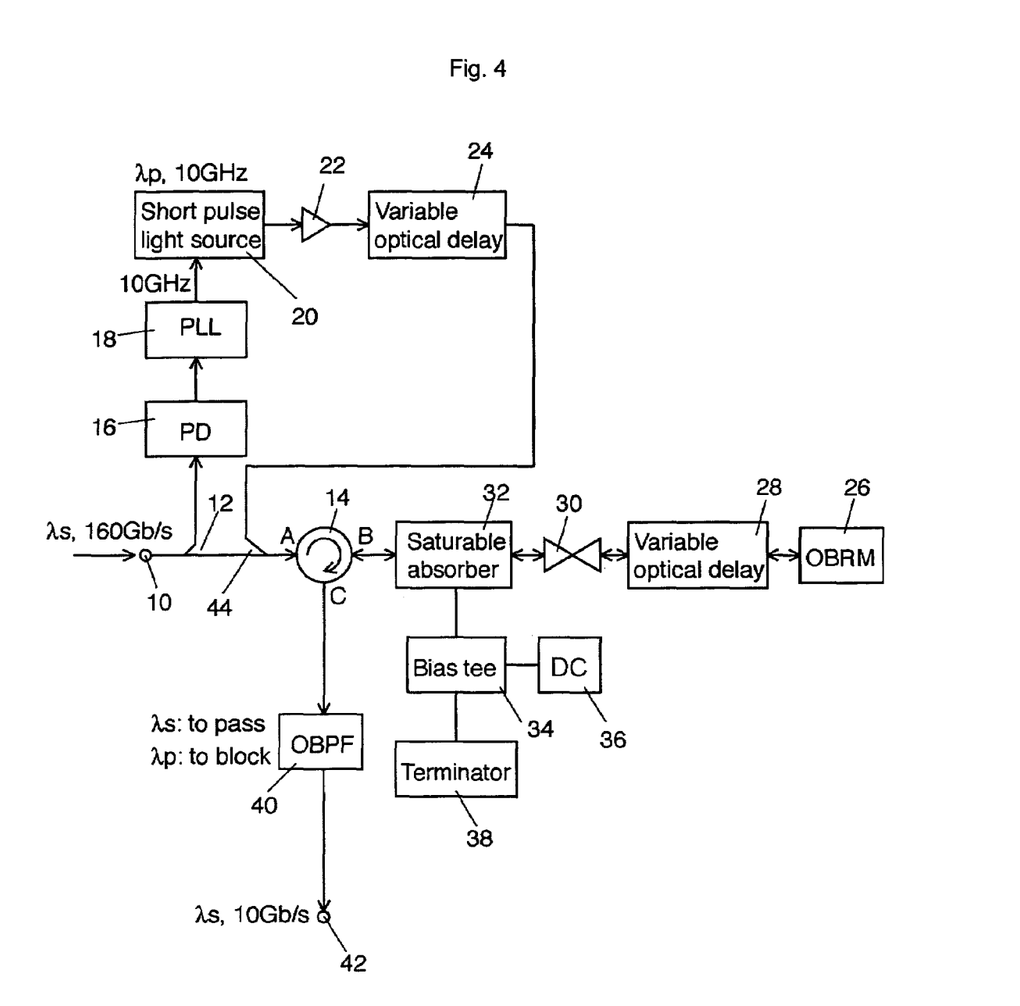
FIG. 4 is a schematic block diagram of a second explanatory embodiment according to the invention.

It is also applicable to combine an optical clock pulse of control wavelength λp with an input pulse signal light of signal wavelength λs and to apply the combined light to a saturable absorber. FIG. 4 shows a schematic block diagram of a second explanatory embodiment modified in that manner. Elements identical to those in FIG. 1 are labeled with the common reference numerals in FIG. 4.

In the explanatory embodiment shown in FIG. 4, an optical combiner 44 is disposed between the optical splitter 12 and the optical circulator 14. The optical combiner 44 combines a pulse signal light of the signal wavelength λs at 160 Gbps output from the optical splitter 12 with an optical clock of the control wavelength λp at 10 GHz and applies the combined light to the port A of the optical circulator 14. The optical band reflection mirror 26 can be any mirror as far as it selectively reflects only the signal wavelength λs. That is, the mirror 26 passes through all wavelengths except for the signal wavelength λs.

In the explanatory embodiment shown in FIG. 4, the delay time of the variable optical delay 24 is also set so that an optical clock pulse of the control wavelength λp enters the saturable absorber 32 almost simultaneously with a pulse signal light of the signal wavelength λs. Furthermore, the delay time of the variable optical delay 28 is set so that a signal light of the signal wavelength λs which was output from the saturable absorber 32 and reflected by the mirror 26 re-enters the saturable absorber 32 almost simultaneously with another optical clock pulse of the control wavelength λp.

In the embodiment shown in FIG. 4, the signal light also reciprocates in the saturable absorber 32 to receive the effect for channel demultiplexing on both ways of going and returning due to the optical clock pulse of the control wavelength λp. Accordingly, the embodiment can realize a high channel demultiplexing performance similar to the embodiment shown in FIG. 1. Also, similar to the embodiment in FIG. 1, the embodiment has a low polarization dependency and therefore it is easy to be used.

While the invention has been described with reference to the specific embodiment, it will be apparent to those skilled in the art that various changes and modifications can be made to the specific embodiment without departing from the spirit and scope of the invention as defined in the claims.

The invention claimed is:

1. An optical pulse demultiplexer comprising:
an optical splitter to split a pulse signal light of a signal wavelength at a bit rate into a first light portion and a second light portion;
an optical clock generator to generate an optical clock of a control wavelength at a predetermined frequency lower than a frequency corresponding to the bit rate of the first light portion output from the optical splitter;
a saturable absorber having a transmission factor relative to the signal wavelength,
wherein the transmission factor varies due to absorption of a light of the control wavelength by the saturable absorber;
an optical path to apply the optical clock output from the optical clock generator to the saturable absorber through one side of the saturable absorber;
an optical bandpass reflection mirror disposed on the optical path and to reflect a light of the signal wavelength and to transmit a light of the control wavelength;
an optical bandpass filter to transmit a light of the signal wavelength and to block a light of the control wavelength; and
an optical circulator disposed on another side of the saturable absorber and to apply the second light portion output from the optical splitter to the saturable absorber and to apply an output light from the saturable absorber into the optical bandpass filter,
wherein the pulse signal light of the signal wavelength reciprocates in the saturable absorber and
wherein each optical pulse of the pulse signal light of the signal wavelength enters the saturable absorber almost simultaneously with different optical pulses of the optical clock on the ways of going and returning.

2. The demultiplexer of claim 1 further comprising:
a first optical delay disposed between the optical band reflection mirror and the saturable absorber on the optical path; and
a second optical delay disposed between the optical clock generator and the optical band reflection mirror on the optical path.

3. The demultiplexer of claim 2 wherein
the pulse signal light comprises a spectrum component at the predetermined frequency; and
the optical clock generator comprises a photoelectric converter to convert one of the output lights from the optical splitter into an electric signal, an electric clock generator to generate an electric clock at the predetermined frequency out of an electric output from the photoelectric converter, and a pulse light source to output the optical clock of the control wavelength at the predetermined frequency according to the electric clock output from the electric clock generator.

4. The demultiplexer of claim 1 wherein
the pulse signal light comprises a spectrum component at predetermined frequency; and
the optical clock generator comprises a photoelectric converter to convert one of the output lights from the optical splitter into an electric signal, an electric clock generator to generate an electric clock at the predetermined frequency out of an electric output from the photoelectric converter, and a pulse light source to output the optical clock of the control wavelength at the predetermined frequency according to the electric clock output from the electric clock generator.

5. The demultiplexer of any one of claims 1 to 4 further comprising a bidirectional optical amplifier disposed between the optical band reflection mirror and the saturable absorber on the optical path.

6. The demultiplexer of claim 1 wherein when the pulse signal light of the signal wavelength is being reciprocated in the saturable absorber, the pulse signal light of the signal wavelength receives at least two pulse demultiplexing effects.

7. The demultiplexer of claim 1 wherein the pulse signal light of the signal wavelength is demultiplexed at least twice.

8. The demultiplexer of claim 1 wherein the light of the signal wavelength transmitted from the optical bandpass filter comprises a channel portion of the pulse signal light of the signal wavelength.

9. The demultiplexer of claim 1 wherein the light of the signal wavelength transmitted from the optical bandpass filter comprises a channel portion of the pulse signal light of the signal wavelength and wherein the channel portion is transmitted after the pulse signal light of the signal wavelength has been reciprocated in the saturable absorber.

10. An optical pulse demultiplexer comprising:
an optical splitter to split a pulse signal light of a signal wavelength at a bit rate into a first light portion and a second light portion;
an optical clock generator to generate an optical clock of a control wavelength at a predetermined frequency lower than a frequency corresponding to the bit rate of the first light portion output from the optical splitter;
a saturable absorber having a transmission factor relative to the signal wavelength,
wherein the transmission fact varies due to absorption of a light of the control wavelength by the saturable absorber;
an optical combiner to combine the optical clock output from the optical clock generator and the other output light from the optical splitter;
an optical band reflection mirror disposed on one side of the saturable absorber and to reflect a light of the signal wavelength and not to reflect a light of the control wavelength;
an optical bandpass filter to transmit a light of the signal wavelength and to block a light of the control wavelength; and
an optical circulator disposed on another side of the saturable absorber and to apply the second light portion output from the optical combiner into the saturable absorber and to apply an output light from the saturable absorber to the optical bandpass filter,
wherein the pulse signal light of the signal wavelength reciprocates in the saturable absorber and
wherein each optical pulse of the pulse signal light of the signal wavelength enters the saturable absorber almost simultaneously with different optical pulses of the optical clock on the ways of going and returning.

11. The demultiplexer of claim 10 further comprising:
a first optical delay disposed between the optical band reflection mirror and the saturable absorber; and
a second optical delay disposed between the optical clock generator and the optical combiner.

12. The demultiplexer of claim 11 wherein
the pulse signal light comprises a spectrum component at the predetermined frequency; and
the optical clock generator comprises an optoelectric converter to convert one of the output lights from the optical splitter into an electric signal, an electric clock generator to generate an electric clock at the predetermined frequency out of an electric output from the optoelectric converter, and a pulse light source to output the optical clock of the control wavelength at the predetermined frequency according to the electric clock output from the electric clock generator.

13. The demultiplexer of claim 10 wherein
the pulse signal light comprises a spectrum component at the predetermined frequency; and
the optical clock generator comprises an optoelectric converter to convert one of the output lights from the optical splitter into an electric signal, an electric clock generator to generate an electric clock at the predetermined frequency out of an electric output from the optoelectric converter, and a pulse light source to output the optical clock of the control wavelength at the predetermined frequency according to the electric clock output from the electric clock generator.

14. The demultiplexer of any one of claims 10 to 13 further comprising a bidirectional optical amplifier disposed between the optical band reflection mirror and the saturable absorber on the optical path.

15. An optical pulse demultiplexing method comprising:
generating an optical clock of a control wavelength at a predetermined frequency out of an input pulse signal light of a signal wavelength at a bit rate, the predetermined frequency being lower than a frequency corresponding to the bit rate;
entering an optical pulse of the input pulse signal light into a saturable absorber almost simultaneously with an optical pulse of the optical clock;
turning back a light of the signal wavelength output from the saturable absorber to reenter into the saturable absorber almost simultaneously with another optical pulse of the optical clock; and extracting an optical signal of the signal wavelength having reciprocated in the saturable absorber.

16. An optical pulse demultiplexing apparatus comprising:
- means for generating an optical clock of a control wavelength at a predetermined frequency out of an input pulse signal light of a signal wavelength at a bit rate, the predetermined frequency being lower than a frequency corresponding to the bit rate of the input pulse signal light;
- means for applying an optical pulse of the input pulse signal light into a saturable absorber almost simultaneously with an optical pulse of the optical clock;
- means for turning back a light of the signal wavelength output from the saturable absorber;
- means for applying the turned back light of the signal wavelength into the saturable absorber almost simultaneously with another optical pulse of the optical clock; and
- means for extracting an optical signal of the signal wavelength having reciprocated in the saturable absorber.

17. The apparatus of claim 16 wherein the optical pulse of the input pulse signal light and the optical pulse of the optical clock are applied into the saturable absorber in opposite directions.

18. The apparatus of claim 16 wherein the optical pulse of the input pulse signal light and the optical pulse of the optical clock are applied into the saturable absorber in a same direction.

19. The apparatus of claim 16 wherein the input pulse signal light comprises an ultra high-speed optical pulse and wherein the extracted optical signal comprises a low-speed optical pulse signal.

20. The apparatus of claim 16 wherein the bit rate of the input pulse signal light is not less than 160 Gbps and wherein extracted optical signal has a bit rate of about 10 Gbps.

* * * * *

UNITED STATES PATENT AND TRADEMARK OFFICE
CERTIFICATE OF CORRECTION

PATENT NO. : 7,260,331 B2
APPLICATION NO. : 10/927798
DATED : August 21, 2007
INVENTOR(S) : Tetsuya Miyazaki It is certified that error appears in the above-identified patent and that said Letters Patent is hereby corrected as shown below:

In the Claims

Column 9, line 22, Claim 4         Before "predetermined",
                                   Insert --the--

Column 12, line 15, Claim 20       Before "extracted",
                                   Insert --the--

Signed and Sealed this

Eighth Day of April, 2008

JON W. DUDAS
*Director of the United States Patent and Trademark Office*